US010921695B2

(12) United States Patent
Hsu et al.

(10) Patent No.: US 10,921,695 B2
(45) Date of Patent: Feb. 16, 2021

(54) WAVELENGTH-CONVERTING WHEEL AND PROJECTION APPARATUS

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/455,779

(22) Filed: Jun. 28, 2019

(65) Prior Publication Data
US 2020/0004118 A1  Jan. 2, 2020

(30) Foreign Application Priority Data
Jul. 2, 2018  (CN) .......................... 201821032051.2

(51) Int. Cl.
*G03B 21/16* (2006.01)
*G02B 26/00* (2006.01)
*G03B 21/20* (2006.01)

(52) U.S. Cl.
CPC ............ *G03B 21/16* (2013.01); *G02B 26/008* (2013.01); *G03B 21/204* (2013.01)

(58) Field of Classification Search
CPC ..... G03B 21/16; G03B 21/204; G02B 26/008
USPC .......................................................... 353/56
See application file for complete search history.

(56) References Cited

U.S. PATENT DOCUMENTS

2007/0273841 A1 * 11/2007 Yu .......................... G03B 33/08
                                                                    353/84
2009/0109514 A1    4/2009 Liao et al.
2017/0180686 A1 *  6/2017 Chen .................... H04N 9/3114

FOREIGN PATENT DOCUMENTS

| CN | 104834169 A | 8/2015 |
| JP | 2004-325721 | * 11/2004 |
| TW | 200624989 A | 7/2006 |
| TW | 200834215 A | 8/2008 |
| TW | I306984 B | 3/2009 |
| TW | 201207427 A1 | 2/2012 |
| TW | 201715288 A | 5/2017 |
| TW | 201738647 A | 11/2017 |

OTHER PUBLICATIONS

Translation of JP2004325721 (Year: 2020).*

* cited by examiner

*Primary Examiner* — Jerry L Brooks (57) ABSTRACT

A wavelength-converting wheel includes a motor, a turntable, a pressing ring, a first balance block and an adhesive layer. The motor has a rotating shaft. The turntable has an inner ring portion and an annular irradiation portion. The inner ring portion is sleeved on the rotating shaft. The annular irradiation portion is connected to an outer edge of the inner ring portion. The pressing ring is sleeved on the rotating shaft and pressed and abutted against the inner ring portion. The pressing ring has a first surface and a second surface. The second surface faces the inner ring portion. The first balance block is disposed on the first surface. The adhesive layer is adhered between the second surface of the pressing ring and the inner ring portion. A heat insulation structure is disposed in the projection direction where the first balance block is projected on the inner ring portion.

10 Claims, 8 Drawing Sheets

WAVELENGTH-CONVERTING WHEEL AND PROJECTION APPARATUS

CROSS-REFERENCE TO RELATED APPLICATION

This application claims the priority benefit of CN201821032051.2, filed on 2018 Jul. 2. The entirety of the above-mentioned patent application is hereby incorporated by reference herein and made a part of this specification.

FIELD OF THE INVENTION

The invention relates to a display apparatus, and more particularly to a wavelength-converting wheel and a projection apparatus using the wavelength-converting wheel.

BACKGROUND OF THE INVENTION

With the market requirements for brightness, color saturation, service life, non-toxic environmental protection, etc of projection apparatus, the types of light sources used in the projection apparatus have evolved from UHP lamp, light emitting diode (LED) and laser diode (LD)

At present, the cost of high-brightness red laser diodes and green laser diodes is too high. In order to reduce the cost, a blue laser diode is used to excite the phosphor powder on the phosphor wheel to generate yellow light and green light. The desired red light is filtered out of the yellow light by a filter wheel. Together with the blue light emitted by the blue laser diode, the three primary colors of red, green and blue required for the projection image are generated.

The phosphor wheel is an extremely important component of the projection apparatus using a laser diode as a light source currently. The phosphor wheel is responsible for converting a part of blue light emitted by the blue laser diode into a yellow light and a green light. Since the phosphor wheel is a component in a high-speed rotation and must have sufficient balance, balance glue is added to the phosphor wheel to prevent from shaking or imbalance of the phosphor wheel in a high-speed rotation. However, when the phosphor wheel is overheated due to irradiation of the laser diode, the balance glue may deteriorate and a situation in which the balance glue may fly away from the phosphor wheel in a high-speed rotation may happen. Therefore, how to avoid the heat of the balance glue is an important issue.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength-converting wheel, which has better reliability.

The invention provides a projection apparatus, a phosphor wheel of which has better reliability.

Other objectives and advantages of the invention can be further understood from the technical features disclosed herein.

In order to achieve one or a part or all of the objectives or other objectives, one embodiment of the invention provides a wavelength-converting wheel, which includes a motor, a turntable, a pressing ring, a first balance block and an adhesive layer. The motor has a rotating shaft. The turntable has an inner ring portion and an annular irradiation portion. The inner ring portion is sleeved on the rotating shaft, and the annular irradiation portion is connected to an outer edge of the inner ring portion. The annular irradiation portion includes a wavelength-converting region. The pressing ring is sleeved on the rotating shaft and pressed and abutted against the inner ring portion. The pressing ring has a first surface and a second surface opposite to each other, and the second surface faces the inner ring portion. The first balance block is disposed on the first surface. The adhesive layer is adhered between the second surface of the pressing ring and the inner ring portion. A heat insulation structure is disposed in the projection direction where the first balance block is projected on the inner ring portion.

In order to achieve one or a part or all of the objectives or other objectives, one embodiment of the invention provides a projection apparatus, which includes an illumination system, a light valve and a projection lens. The illumination system is configured to provide an illumination beam. The light valve is disposed on a transmission path of the illumination beam to convert the illumination beam into an image beam. The projection lens is disposed on a transmission path of the image beam. The illumination system includes an exciting light source and the wavelength-converting wheel. The exciting light source is configured to provide an excited beam. The wavelength-converting wheel is disposed on a transmission path of the excited beam. The wavelength-converting region of the wavelength-converting wheel is configured to convert the excited beam into a converted beam. The plate of the wavelength-converting wheel is configured to reflect the excited beam or allow the excited beam to pass therethrough, and the illumination beam includes the converted beam and the excited beam.

In the wavelength-converting wheel and projection apparatus of the embodiments of the invention, the heat insulation structure provided in the projection direction where the first balance block is projected on the inner ring portion can reduce the heat generated by the excited beam irradiating the wavelength-converting wheel directly transmitted to the first balance block, thus the first balance block is prevented from deteriorating due to heat, and the situation in which the first balance block flies away from the wavelength-converting wheel in a high-speed rotation is avoided. Therefore, the heat insulation structure enables the wavelength-converting wheel to have better reliability.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
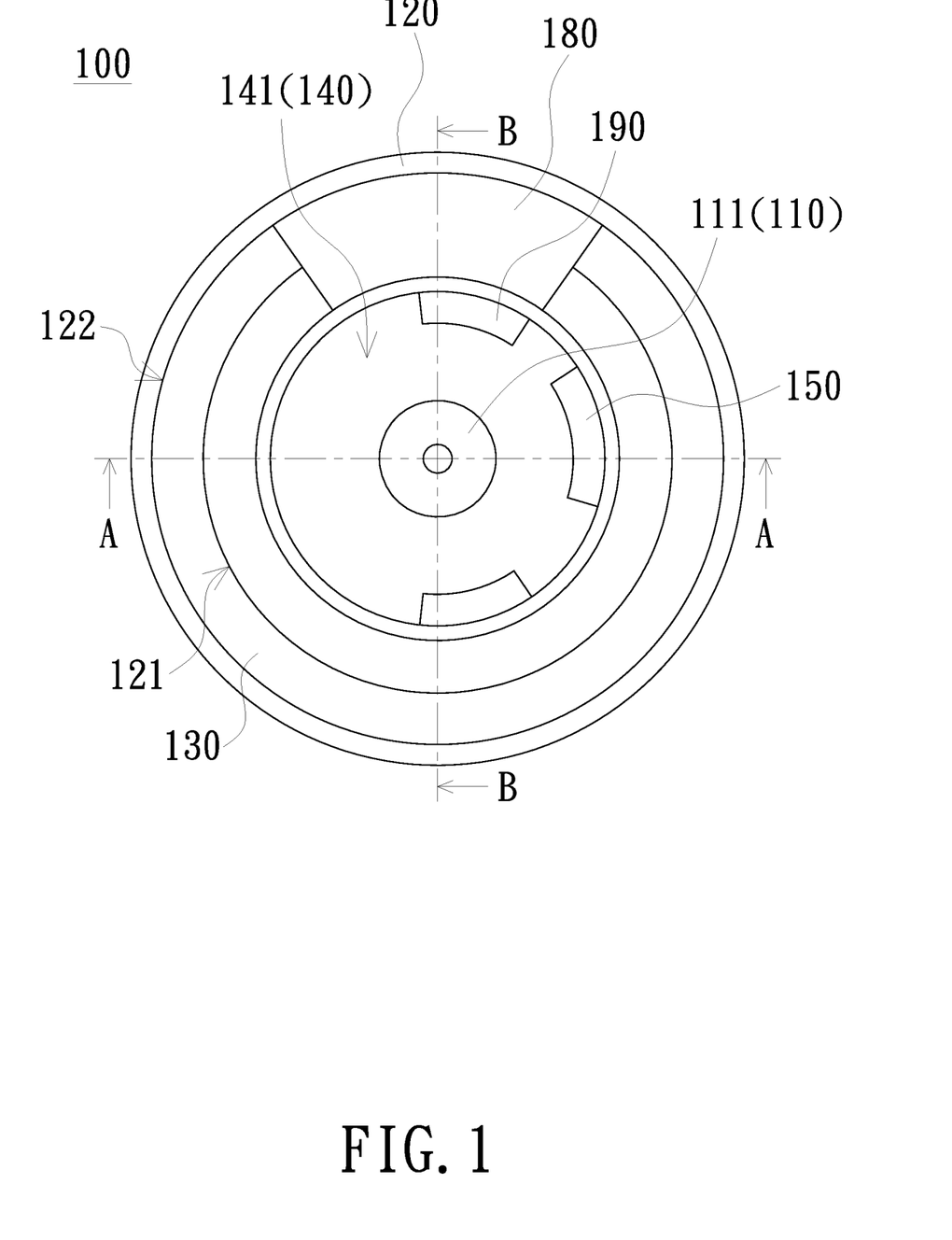
FIG. 1 is a schematic view of a wavelength-converting wheel according to an embodiment of the invention.
Figure 2:
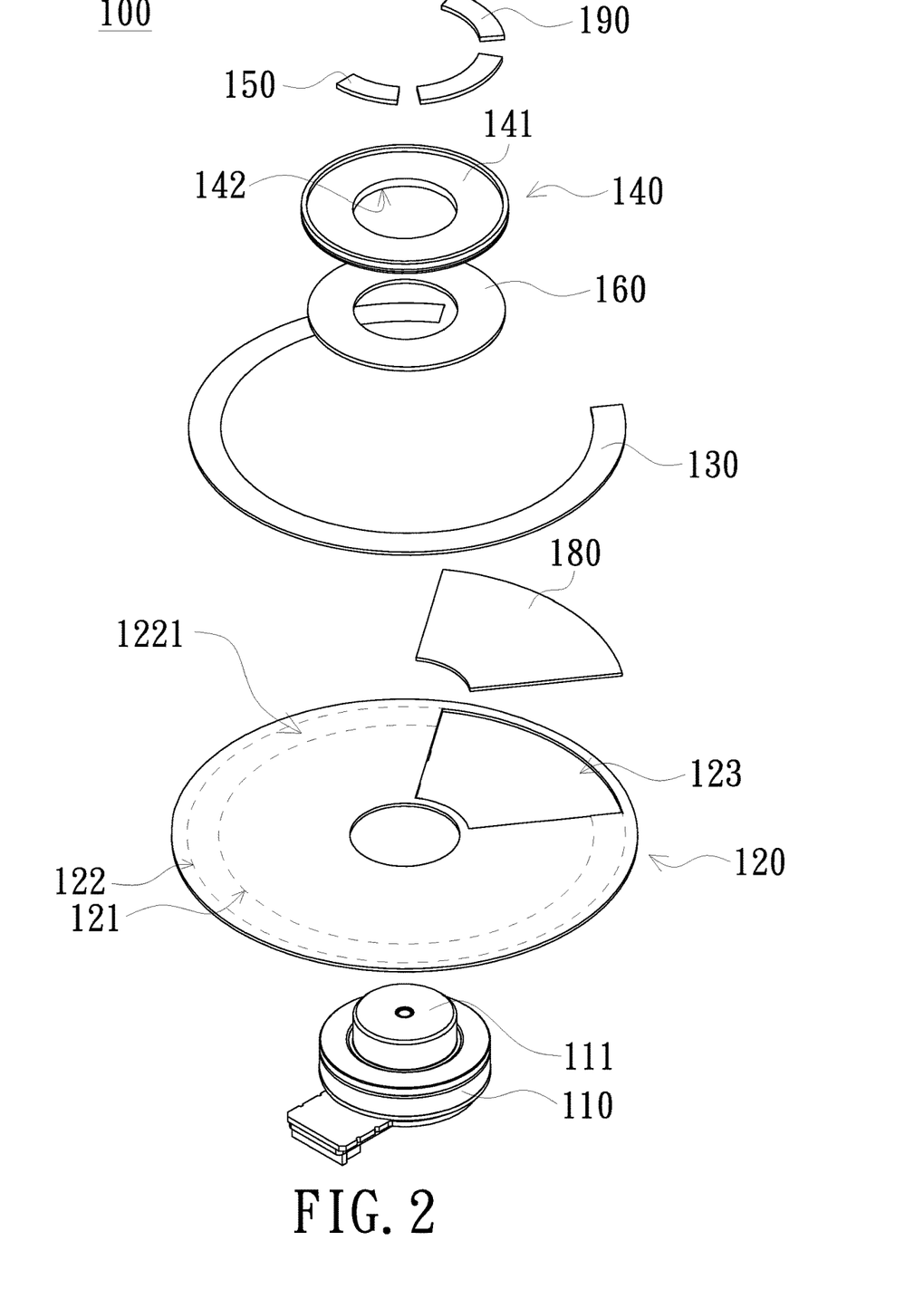
FIG. 2 is a schematic exploded view of FIG. 1.
Figure 3:
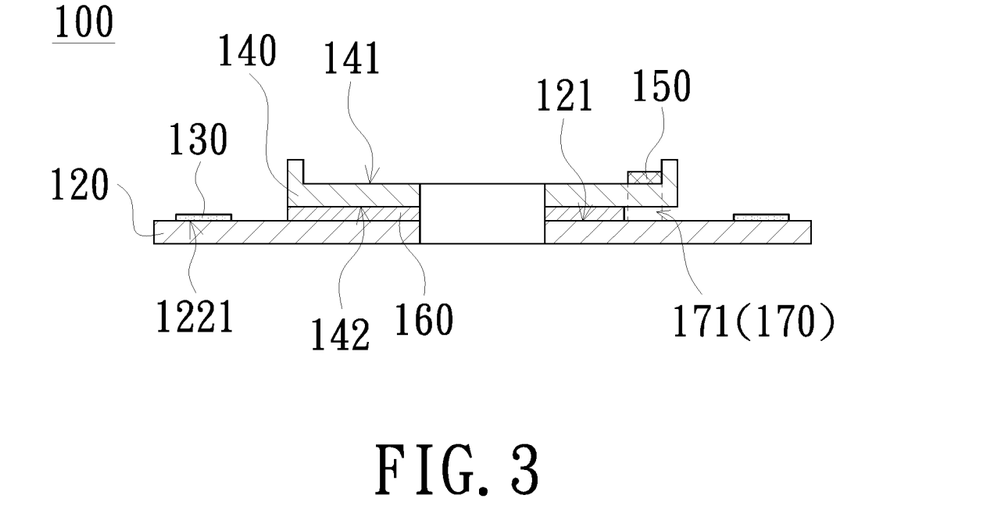
FIG. 3 is a schematic cross-sectional view taken along the line A-A of FIG. 1.

FIG. 1 is a schematic view of a wavelength-converting wheel according to an embodiment of the invention. FIG. 2 is a schematic exploded view of FIG. 1. FIG. 3 is a schematic cross-sectional view taken along the line A-A of FIG. 1. Please refer to FIG. 1, FIG. 2 and FIG. 3, the wavelength-converting wheel 100 of the embodiment includes a motor 110, a turntable 120, a wavelength-converting layer 130, a pressing ring 140, a first balance block 150 and an adhesive layer 160. The motor 110 has a rotating shaft 111. The turntable 120 has an inner ring portion 121 and an annular irradiation portion 122. The turntable 120 is a metal turntable, and the material thereof is, for example, aluminum, but is not limited thereto. The inner ring portion 121 is sleeved on the rotating shaft 111, and the annular irradiation portion 122 is connected to an outer edge of the inner ring portion 121. The annular irradiation portion 122 refers to an area that is preset to be irradiated by an excited beam as the turntable 120 rotates. The annular irradiation portion 122 includes a wavelength-converting region 1221, and the wavelength-converting layer 130 is disposed on the wavelength-converting region 1221. The material of the wavelength-converting layer 130 may be a fluorescent material, a phosphorescent material such as a phosphor or a nano material such as a quantum dot, but is not limited thereto. The wavelength-converting layer 130 may also include a plurality of blocks, the blocks are provided with wavelength-converting materials that can be excited to emit beams of different colors respectively. The pressing ring 140 is sleeved on the rotating shaft 111 and pressed and abutted against the inner ring portion 121. The pressing ring 140 is a metal pressing ring, and the material thereof is, for example, aluminum, but is not limited thereto. The pressing ring 140 has a first surface 141 and a second surface 142 opposite to each other, and the second surface 142 faces the inner ring portion 121. The first balance block 150 is disposed on the first surface 141. The first balance block 150 is, for example, balance soil or balance glue, but is not limited thereto. The adhesive layer 160 is adhered between the second surface 142 of the pressing ring 140 and the inner ring portion 121. A heat insulation structure 170 is, for example, disposed in a projection direction where the first balance block 150 is projected on the inner ring portion 121.

Please refer to FIG. 3, the adhesive layer 160 is, for example, not extended to the projection direction where the first balance block 150 is projected on the inner ring portion 121, so as to form an air layer 171 located between the pressing ring 140 and the inner ring portion 121 in the projection direction. The heat insulation structure 170 includes, for example, the air layer 171.

Since both of the turntable 120 and the pressing ring 140 of the wavelength-converting wheel 100 are made of metal material, the heat generated when the excited beam is irradiated to the wavelength-converting region 1221 is easily directly transmitted to the first balance block 150 along the turntable 120 via the adhesive layer 160 and the pressing ring 140 in the shortest path. Thus, the first balance block 150 may deteriorate due to heat, and a situation in which the first balance block 150 flies away from the wavelength-converting wheel 100 in a high-speed rotation may happen. Therefore, in the embodiment, the heat of the first balance block 150 can be reduced by providing with the heat insulation structure 170. In addition, in the embodiment, the heat conduction area can be reduced by using the air layer 171 as the heat insulation structure 170, and the transmission path of the heat from the turntable 120 to the first balance block 150 can be extended. When the wavelength-converting wheel 100 rotates at a high speed, an air flow can also be generated to help dissipate heat. As such, the wavelength-converting wheel 100 can have better reliability.

The number of the first balance blocks 150 is, for example, plural, and according to different design requirements, for example, a heat insulation structure 170 is disposed in a projection direction where at least one first balance block 150 is projected on the inner ring portion 121. In addition, the portion that does not correspond to the first balance block 150 is, for example, not provided with the heat insulation structure 170, but is not limited thereto; however, for consideration of the convenience of the manufacturing process or the balance, the heat insulation structure 170 may be provided.

Figure 4:
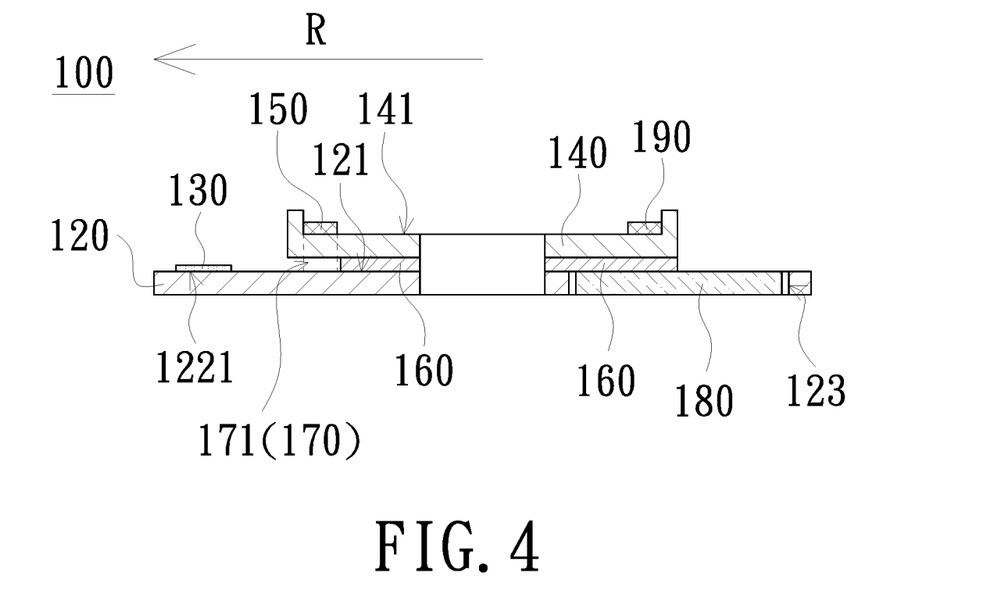
FIG. 4 is a schematic cross-sectional view taken along the line B-B of FIG. 1.

FIG. 4 is a schematic cross-sectional view taken along the line B-B of FIG. 1. Please refer to FIG. 1, FIG. 2 and FIG. 4, the wavelength-converting wheel 100 further includes, for example, a plate 180 and a second balance block 190. The turntable 120 further has, for example, a fan-shaped opening 123 extending from the annular irradiation portion 122 to the inner ring portion 121. The plate 180 is embedded in the fan-shaped opening 123 and has a shape corresponding to the fan-shaped opening 123. The plate 180 includes, for example, a light reflection component or a light penetration component and is configured to reflect the excited beam or allow the excited beam to pass therethrough. The plate 180 is, for example, a glass substrate, but is not limited thereto. When the plate 180 is used as the light reflection component, a reflective film may be, for example, plated on the glass substrate to achieve a reflective effect. The second balance block 190 is disposed on the first surface 141 and overlapped with the plate 180. The second balance block 190 is, for example, balance soil or balance gel, but not limited thereto. The first balance block 150 corresponds to the wavelength-converting region 1221 in a radial direction R, that is, the portion of the first balance block 150 projected on the turntable 120 is the inner ring portion 121 and is not the plate 180, and the portion of the second balance block 190 projected on the turntable 120 is the plate 180.

Specifically, since the wavelength-converting wheel 100 of the embodiment uses a glass substrate for the plate 180, the heat conduction effect thereof is poor than the metal turntable 120. Therefore, the heat insulation structure 170 may not be disposed in the projection direction where the second balance block 190 is projected on the plate 180, but is not limited thereto; and for consideration of the convenience of the manufacturing process or balance, the heat insulation structure 170 may be provided.

Figure 5:
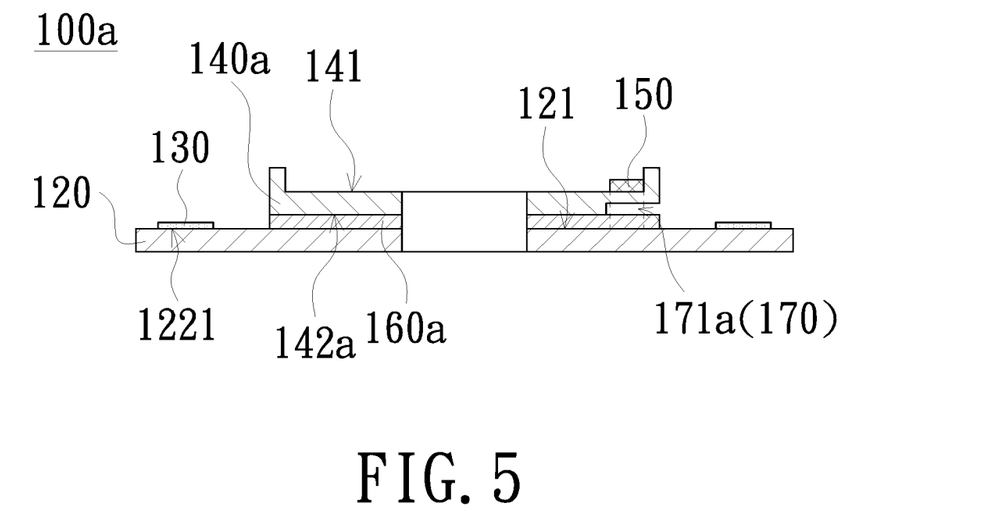
FIG. 5 is a schematic cross-sectional view of a wavelength-converting wheel according to another embodiment of the invention.

FIG. 5 is a schematic cross-sectional view of a wavelength-converting wheel according to another embodiment of the invention. Please refer to FIG. 5, the wavelength-converting wheel 100a of the embodiment is similar to the wavelength-converting wheel 100 in structures and advantages, and the following only explains the main differences in the structure. In the wavelength-converting wheel 100a of the embodiment, the second surface 142a has a depression in the projection direction where the first balance block 150 is projected on the inner ring portion121, so as to form an air layer 171a located between the pressing ring 140a and the adhesive layer 160a in the projection direction. The heat insulation structure 170 includes the air layer 171a.

Figure 6:
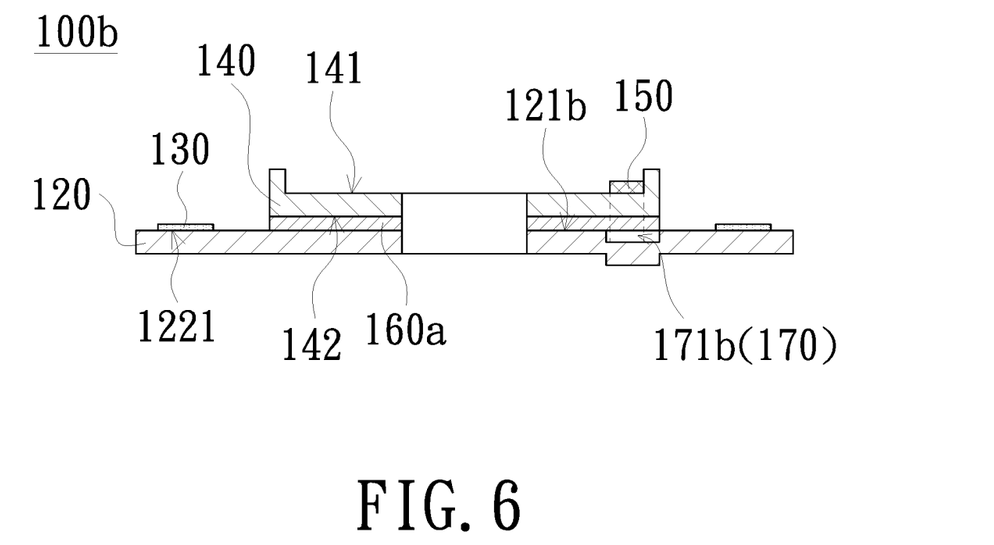
FIG. 6 is a schematic cross-sectional view of a wavelength-converting wheel according to another embodiment of the invention.

FIG. 6 is a schematic cross-sectional view of a wavelength-converting wheel according to another embodiment of the invention. Please refer to FIG. 6, the wavelength-converting wheel 100b of the embodiment is similar to the wavelength-converting wheel 100 in structures and advantages, and the following only explains the main differences in the structure. In the wavelength-converting wheel 100b of the embodiment, a surface of the inner ring portion 121b facing the pressing ring 140 has a depression in the projection direction where the first balance block 150 is projected on the inner ring portion 121b, so as to form an air layer 171b located between the adhesive layer 160a and the inner ring portion 121b in the projection direction. The heat insulation structure 170 includes the air layer 171b.

Figure 7:
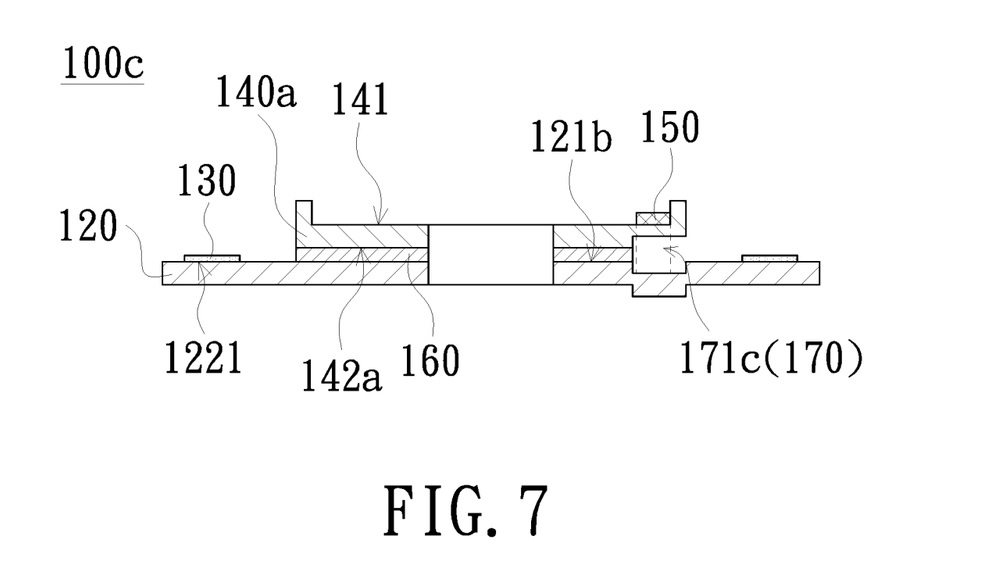
FIG. 7 is a schematic cross-sectional view of a wavelength-converting wheel according to another embodiment of the invention.

In addition to the wavelength-converting wheels 100, 100a and 100b forming the air layers 171, 171a and 171b in different portions respectively, the wavelength-converting wheel 100, 100a and 100b can also be used simultaneously to increase the heat insulation effects of the heat insulation structure 170. FIG. 7 is a schematic cross-sectional view of a wavelength-converting wheel according to another embodiment of the invention. Please refer to FIG. 7, the wavelength-converting wheel 100c of the embodiment is similar to the wavelength-converting wheel 100 in structures and advantages, and the following only explains the main differences in the structure. In the wavelength-converting wheel 100c of the embodiment, the adhesive layer 160 is not extended to the projection direction where the first balance block 150 is projected on the inner ring portion 121b, the second surface 142a has a depression in the projection direction, and a surface of the inner ring portion 121b facing the pressing ring 140a has a depression in the projection direction, so as to form an air layer 171c located between the pressing ring 140a and the inner ring portion 121b in the projection direction. The heat insulation structure 170 includes the air layer 171c.

Figure 8A:
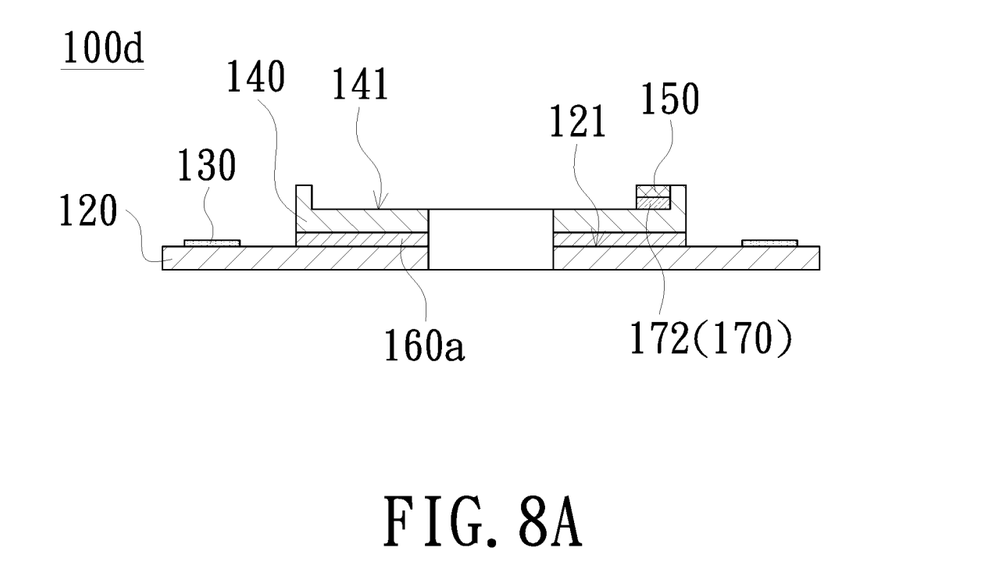
FIG. 8A and FIG. 8B are schematic cross-sectional views of a wavelength-converting wheel according to another embodiment of the invention.
Figure 8B:
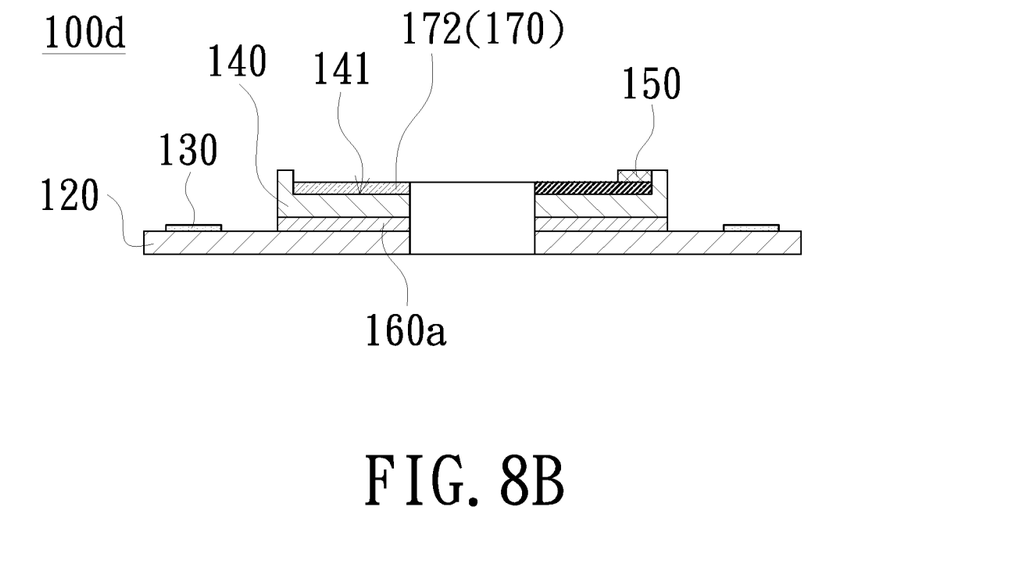

In addition to the air layers 171, 171a, 171b and 171c, the heat insulation structure 170 further includes, for example, other forms. FIG. 8A and FIG. 8B are schematic cross-sectional views of a wavelength-converting wheel according to another embodiment of the invention. Please refer to FIG. 8A and FIG. 8B, the heat insulation structure 170 of the embodiment is located in the projection direction where the first balance block 150 is projected on the inner ring portion 121. The heat insulation structure 170 includes a first heat insulation layer 172 disposed on the first surface 141, and the first balance block 150 is disposed on the first heat insulation layer 172. The first heat insulation layer 172 is, for example, a heat insulation coating or a heat insulation glue, wherein the material of the heat insulation glue is, for example, UV glue, but is not limited thereto.

The first heat insulation layer 172 is, for example, disposed between the first balance block 150 and the first surface 141 (as shown in FIG. 8A), or, the first heat insulation layer 172 may also be disposed to cover the entire first surface 141 (as shown in FIG. 8B). The wavelength-converting wheel 100d is similar to the wavelength-converting wheels 100, 100a, 100b and 100c in advantages, and no redundant detail is to be given herein.

Figure 9:
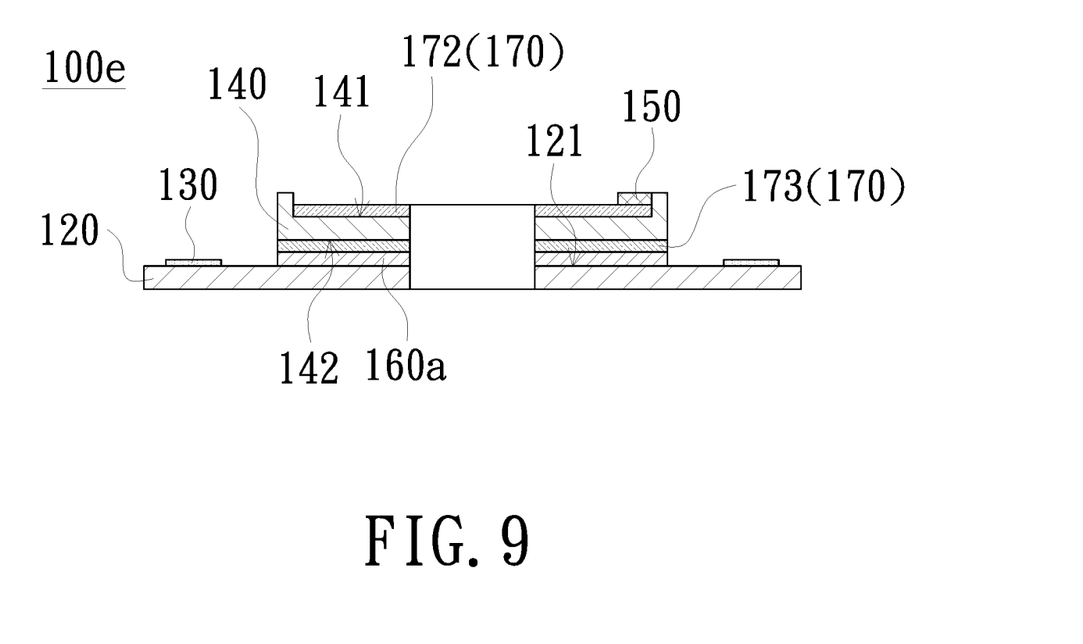
FIG. 9 is a cross-sectional view of a wavelength-converting wheel according to another embodiment of the invention.

In order to further improve the heat insulation effect, a heat insulation layer may also be disposed on the second surface 142. FIG. 9 is a cross-sectional view of a wavelength-converting wheel according to another embodiment of the invention. Please refer to FIG. 9, the wavelength-converting wheel 100e of the embodiment is similar to the wavelength-converting wheel 100d in structures and advantages, and the difference is only that the heat insulation structure 170 further includes a second heat insulation layer 173 disposed on the second surface 142. The material of the second heat insulation layer 173 is, for example, the same as the first heat insulation layer 172, but is not limited thereto.

Figure 10:
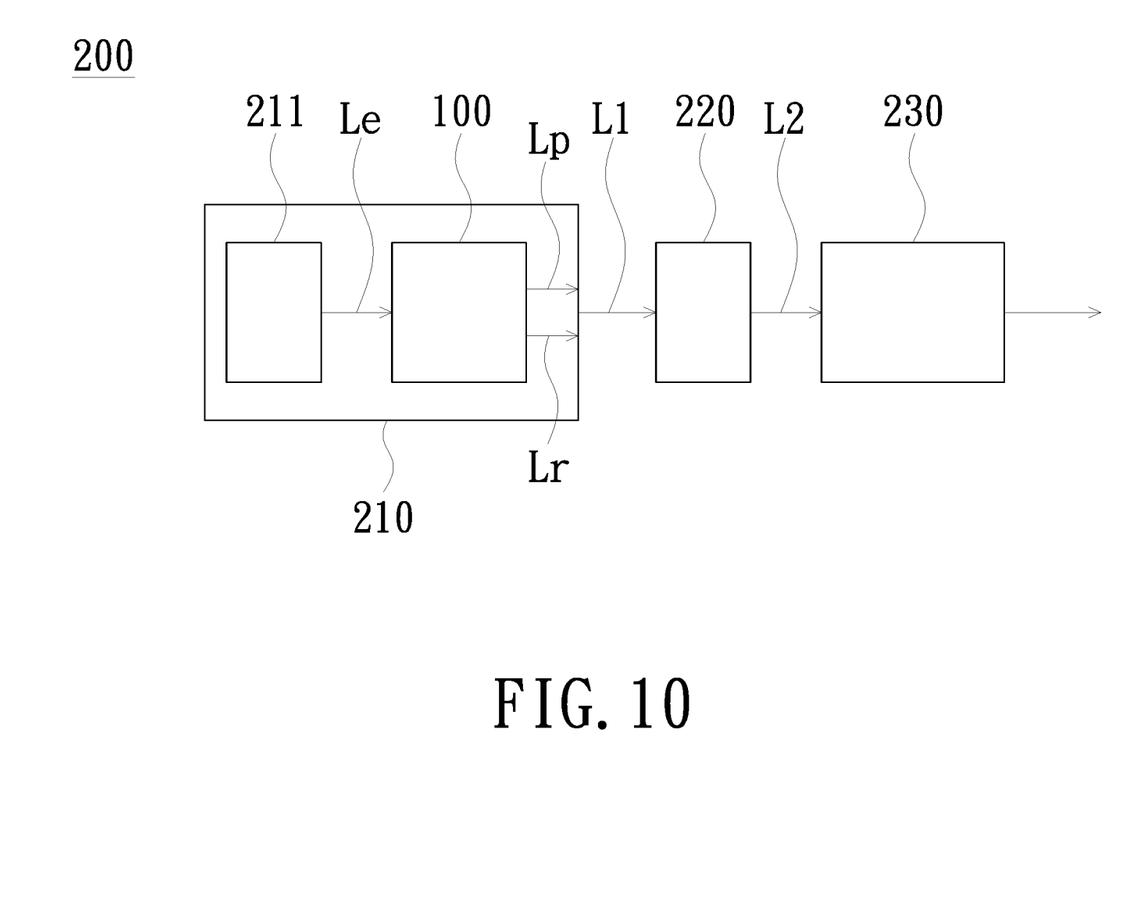
FIG. 10 is a schematic block view of a projection apparatus according to an embodiment of the invention.

FIG. 10 is a schematic block view of a projection apparatus according to an embodiment of the invention. Please refer to FIG. 10, the projection apparatus 200 of the embodiment includes an illumination system 210, a light valve 220 and a projection lens 230. The illumination system 210 is configured to provide an illumination beam L1. The light valve 220 is disposed on the transmission path of the illumination beam L1 to convert the illumination beam L1 into an image beam L2. The projection lens 230 is disposed on the transmission path of the image beam L2 to project the image beam L2 onto a screen so as to form an image frame on the screen. The light valve 220 may be a transmissive light valve or a reflective light valve, wherein the transmissive light valve may be a transmissive liquid-crystal display (LCD) panel, and the reflective light valve may be a digital micro-mirror device (DMD), a liquid-crystal display, a liquid crystal on silicon (LCoS) panel, a transparent liquid crystal panel, an electro-optical modulator, a maganeto-optic modulator, an acousto-optic modulator (AOM), but is not limited thereto. The projection lens 230 includes, for example, a single or a combination of a plurality of optical lenses with diopter, such as including, for example, various combinations of non-planar lens such as a biconcave lens, a biconvex lens, a concave-convex lens, a convexo-concave lens, a plano-convex lens and a plano-concave lens. In an embodiment, the projection lens 230 may includes a plane optical lens. The category and type of the projection lens 230 are not limited in the invention.

Please refer to FIG. 1 and FIG. 10, the illumination system 210 includes an exciting light source 211 and a wavelength-converting wheel 100. The exciting light source 211 includes, for example, a diode module of light-emitting diodes or laser diode chips or a matrix of a plurality of diode modules, and is configured to provide the excited beam Le, but is not limited thereto. The wavelength-converting wheel 100 is disposed on the transmission path of the excited beam Le. Although FIG. 10 is exemplified by the wavelength-converting wheel 100 of FIG. 1, the wavelength-converting wheel 100 may be replaced with the wavelength-converting wheel of any of the above embodiments.

The excited beam Le is configured to irradiate the annular irradiation portion 122 of the wavelength-converting wheel 100. As the wavelength-converting wheel 100 rotates around the rotating shaft 111 as a center, the wavelength-converting layer 130 of the wavelength-converting region 1221 of the annular irradiation portion 122 is configured to convert the excited beam Le into a converted beam Lp. The converted beam Lp is reflected by the annular irradiation portion 122 of the metal turntable 120. The wavelength of the converted beam Lp is different from the wavelength of the excited beam Le. The plate 180 is configured to reflect the excited beam Le or allow the excited beam Le to pass therethrough (in FIG. 10, the plate 180 is exemplified by being as a light reflection component, and Lr denotes the excited beam reflected by the plate 180). Thus, the illumination beam L1 includes the converted beam Lp and the excited beam Lr reflected by a reflective component 140. The illumination system 210 may further include other optical components, so that the illumination beam L1 is transmitted to the light valve 220. The specific configuration of the illumination system 210 is further described below with reference to the accompanying figures, but the specific structure of the illumination system of the invention is not limited to the embodiment listed below.

Figure 11:
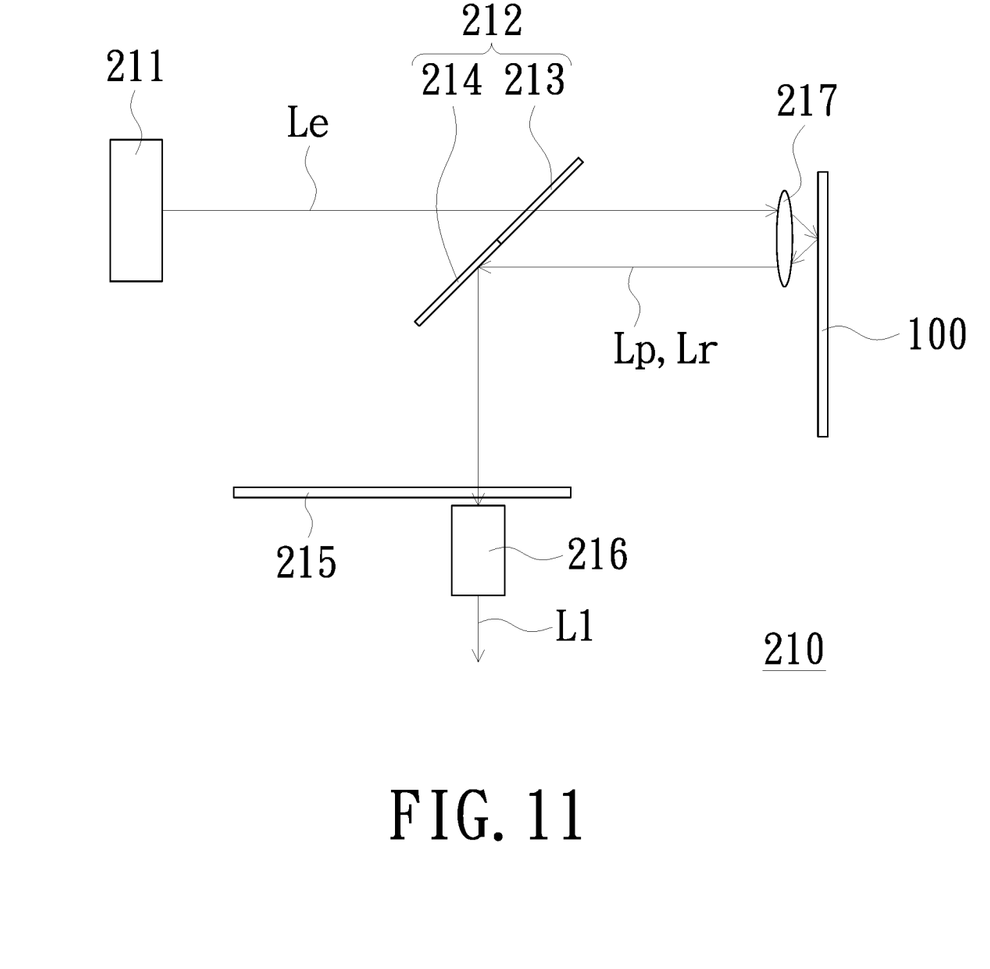
FIG. 11 is a schematic view of an illumination system of a projection apparatus according to an embodiment of the invention.

FIG. 11 is a schematic view of an illumination system of a projection apparatus according to an embodiment of the invention. Please refer to FIG. 10 and FIG. 11. In addition to the exciting light source 211 and the wavelength-converting wheel 100, the illumination system 210 of the embodiment may further include a light combining component 212, a filter wheel 215, a light homogenization component 216 and a condenser lens 217, wherein the light homogenization component 216 may be a light integration rod, but is not limited thereto.

The light combining component 212 is disposed between the exciting light source 211 and the wavelength-converting wheel 100 and includes a color separating portion 213 and a reflecting portion 214. The color separating portion 213 is adjacent to the reflecting portion 214. The color separating portion 213 is configured to allow the excited beams Le, Lr to pass therethrough and reflect the converted beam Lp. The reflecting portion 214 may reflect the excited beams Le, Lr and the converted beam Lp. The condenser lens 217 is disposed between the light combining component 212 and the wavelength-converting wheel 100, and is configured to converge the excited beam Le to be incident on the wavelength-converting wheel 100 and accumulate the converted beam Lp and the excited beam L reflected by the wavelength-converting wheel 100. The excited beam Le provided by the exciting light source 211 passes through the color separating portion 213 of the light combining component 212 and is transmitted to the wavelength-converting wheel 100, and the converted beam Lp and the excited beam Lr reflected from the wavelength-converting wheel 100 are transmitted to the light combining component 212. The excited beam Lr is reflected by the reflecting portion 214 of the light combining component 212 and sequentially passes through the filter wheel 215 and the light homogenization component 216. The converted beam Lp is reflected by the reflecting portion 214 and the color separating portion 213 of the light combining component 212 and then sequentially passes through the filter wheel 215 and the light homogenization component 216. Therefore, the illumination beam L1 provided by the illumination system 210 includes the converted beam Lp and the excited beam Lr.

In summary, in the wavelength-converting wheel and the projection apparatus of the embodiments of the invention, the heat insulation structure provided in the projection direction where the first balance block is projected on the inner ring portion can reduce the heat generated by the excited beam irradiating the wavelength-converting wheel directly transmitted to the first balance block, thus the first balance block is prevented from deteriorating due to heat, and the situation in which the first balance block flies away from the wavelength-converting wheel in a high-speed rotation is avoided. Therefore, the heat insulation structure enables the wavelength-converting wheel to have better reliability.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first balance block, the second balance block, the first surface, the second surface, the first heat insulation layer and the second heat insulation layer are only used for distinguishing various elements and do not limit the number of the elements.

What is claimed is:

1. A wavelength-converting wheel, comprising a motor, a turntable, a wavelength-converting layer, a pressing ring, a first balance block and an adhesive layer, wherein, the motor has a rotating shaft;
   the turntable has an inner ring portion, and an annular irradiation portion, and a fan-shaped opening extending from the annular irradiation portion to the inner ring portion, the inner ring portion is sleeved on the rotating shaft, the annular irradiation portion is connected to an outer edge of the inner ring portion, and the annular irradiation portion comprises a wavelength-converting region;
the wavelength-converting layer is disposed on the wavelength-converting region;
   the pressing ring is sleeved on the rotating shaft and pressed and abutted against the inner ring portion, the pressing ring has a first surface and a second surface opposite to each other, and the second surface faces the inner ring portion;
   the first balance block is disposed on the first surface;
   the adhesive layer is adhered between the second surface of the pressing ring and the inner ring portion,
   wherein a heat insulation structure is disposed in a projection direction where the first balance block is projected on the inner ring portion, the heat insulation structure corresponds to the wavelength-converting layer in a radial direction, and the heat insulation structure is not directly connected to the rotating shaft.

2. The wavelength-converting wheel according to claim 1, further comprising a plate and a second balance block, wherein the plate is embedded in the opening, the second balance block is disposed on the first surface and overlapped with the plate, and the first balance block corresponds to the wavelength-converting region in the radial direction.

3. The wavelength-converting wheel according to claim 2, wherein the plate comprises a light reflection component or a light penetration component.

4. The wavelength-converting wheel according to claim 1, wherein the adhesive layer is not extended to the projection direction so as to form an air layer located between the pressing ring and the inner ring portion in the projection direction, and the heat insulation structure comprises the air layer.

5. The wavelength-converting wheel according to claim 1, wherein the second surface has a depression in the projection direction so as to form an air layer located between the pressing ring and the adhesive layer in the projection direction, and the heat insulation structure comprises the air layer.

6. The wavelength-converting wheel according to claim 1, wherein a surface of the inner ring portion facing the pressing ring has a depression in the projection direction so as to form an air layer located between the adhesive layer and the inner ring portion in the projection direction, and the heat insulation structure comprises the air layer.

7. The wavelength-converting wheel according to claim 1, wherein the adhesive layer is not extended to the projection direction, the second surface has a depression in the projection direction, a surface of the inner ring portion facing the pressing ring has a depression in the projection direction, so as to form an air layer located between the pressing ring and the inner ring portion in the projection direction, and the heat insulation structure comprises the air layer.

8. The wavelength-converting wheel according to claim 1, wherein the heat insulation structure comprises a first heat insulation layer disposed on the first surface, and the first balance block is disposed on the first heat insulation layer.

9. The wavelength-converting wheel according to claim 8, wherein the heat insulation structure further comprises a second heat insulation layer disposed on the second surface.

10. A projection apparatus, comprising an illumination system, a light valve and a projection lens, wherein the illumination system is configured to provide an illumination beam, the light valve is disposed on a transmission path of the illumination beam to convert the illumination beam into an image beam, the projection lens is disposed on a transmission path of the image beam, wherein
   the illumination system comprises an exciting light source and a wavelength-converting wheel, wherein
      the exciting light source is configured to provide an excited beam;
      the wavelength-converting wheel comprises a motor, a turntable, a wavelength-converting layer, a pressing ring, a first balance block and an adhesive layer,
      the motor has a rotating shaft,
      the turntable has an inner ring portion, and an annular irradiation portion, and a fan-shaped opening extending from the annular irradiation portion to the inner ring portion, the inner ring portion is sleeved on the rotating shaft, the annular irradiation portion is connected to an outer edge of the inner ring portion, and the annular irradiation portion comprises a wavelength-converting region, the wavelength-converting layer is disposed on the wavelength-converting region,
      the pressing ring is sleeved on the rotating shaft and pressed and abutted against the inner ring portion, the pressing ring has a first surface and a second surface opposite to each other, and the second surface faces the inner ring portion,
      the first balance block is disposed on the first surface, the adhesive layer is adhered between the second surface of the pressing ring and the inner ring portion, wherein a heat insulation structure is disposed in a projection direction where the first balance block is projected on the inner ring portion, the heat insulation structure corresponds to the wavelength-converting layer in a radial direction, and the heat insulation structure is not directly connected to the rotating shaft, wherein the wavelength-converting wheel is disposed on a transmission path of the excited beam, the wavelength-converting region of the wavelength-converting wheel is configured to convert the excited beam into a converted beam, the a plate of the wavelength-converting wheel is configured to reflect the excited beam or allow the excited beam to pass therethrough, and the illumination beam comprises the converted beam and the excited beam.

* * * * *